US012682541B1

(12) United States Patent
Bakalash

(10) Patent No.: US 12,682,541 B1
(45) Date of Patent: Jul. 14, 2026

(54) NON-PLANAR REAL-TIME MIRRORING BY RASTER GRAPHICS

(71) Applicant: Reuven Bakalash, Shdema (IL)

(72) Inventor: Reuven Bakalash, Shdema (IL)

( * ) Notice: Subject to any disclaimer, the term of this patent is extended or adjusted under 35 U.S.C. 154(b) by 0 days.

(21) Appl. No.: 19/361,026

(22) Filed: Oct. 17, 2025

Related U.S. Application Data

(63) Continuation-in-part of application No. 19/239,000, filed on Jun. 16, 2025.

(51) Int. Cl.
| | |
|---|---|
| *G06T 1/20* | (2006.01) |
| *G06T 15/00* | (2011.01) |
| *G06T 15/04* | (2011.01) |

(52) U.S. Cl.
CPC ............. *G06T 15/005* (2013.01); *G06T 1/20* (2013.01); *G06T 15/04* (2013.01)

(58) Field of Classification Search
CPC .......... G06T 1/20; G06T 15/005; G06T 15/06
USPC ........................................... 345/506
See application file for complete search history.

(56) References Cited

U.S. PATENT DOCUMENTS

| | | | |
|---|---|---|---|
| 7,596,473 | B2 | 9/2009 | Hansen et al. |
| 7,755,620 | B2 | 7/2010 | Scherer et al. |
| 8,751,950 | B2 | 6/2014 | Loberg |
| 8,872,827 | B2 | 10/2014 | Hart |
| 9,007,372 | B2 | 4/2015 | Bakalash |
| 9,117,306 | B2 | 8/2015 | Bakalash |
| 9,409,084 | B2 | 8/2016 | Horovitz et al. |
| 9,595,108 | B2 | 3/2017 | Horovitz et al. |
| 9,633,467 | B2 | 4/2017 | Bakalash |
| 9,805,497 | B2 | 10/2017 | Bakalash |
| 9,821,242 | B2 | 11/2017 | Muthyala et al. |
| 9,827,507 | B2 | 11/2017 | Muthyala et al. |
| 10,089,772 | B2 | 10/2018 | Taylor et al. |
| 10,220,326 | B2 | 3/2019 | Anderson |
| 10,395,416 | B2 | 8/2019 | Bakalash |
| 10,583,354 | B2 | 3/2020 | Muthyala et al. |
| 10,614,612 | B2 | 4/2020 | Bakalash et al. |
| 10,699,468 | B2 | 6/2020 | Bakalash et al. |

(Continued)

FOREIGN PATENT DOCUMENTS

WO WO-2022131949 A1 * 6/2022 ............. G06T 11/40

OTHER PUBLICATIONS

6 AI-powered Interior Design Software Solutions in 2023 https://foyr.com/learn/ai-powered-interior-design-software-tools/ (17 pages).

(Continued)

*Primary Examiner* — Jacinta M Crawford
(74) *Attorney, Agent, or Firm* — May Patents Ltd. c/o Dorit Shem-Tov

(57) ABSTRACT

A method and system of mirroring in non-planar surfaces, based on a GPU raster hardware. A non-planar reflective surface is rasterized into receiving pixels, each having a normal value and position. The surrounding target objects are built into acceleration structure. A receiving pixel, utilizing pixel-shot-triangle search algorithm, traverse the acceleration structure along its normal direction. Upon identification of the target triangle, an exact emitting-pixel is found, and its data (depth, color, lighting, texture, material) is collected to reflection buffer. The exploiting of GPU's massively parallel processing capabilities allows a real-time performance, while utilizing a standard raster graphics.

12 Claims, 9 Drawing Sheets

(56) References Cited

U.S. PATENT DOCUMENTS

| | | | |
|---|---|---|---|
| 10,818,072 | B2 | 10/2020 | Bakalash et al. |
| 10,930,053 | B2 | 2/2021 | Bakalash et al. |
| 10,991,147 | B1 | 4/2021 | Bakalash |
| 11,010,957 | B1 | 5/2021 | Bakalash et al. |
| 11,017,581 | B1 | 5/2021 | Bakalash |
| 11,017,582 | B2 | 5/2021 | Bakalash et al. |
| 11,083,968 | B2 | 8/2021 | Walker et al. |
| 11,120,610 | B2 | 9/2021 | Bakalash et al. |
| 11,331,577 | B2 | 5/2022 | Kai |
| 11,369,864 | B2 | 6/2022 | Zuniga et al. |
| 11,393,153 | B2 | 7/2022 | Yan |
| 11,433,310 | B2 | 9/2022 | Walker et al. |
| 11,472,112 | B2 | 10/2022 | Momose et al. |
| 11,478,708 | B1 | 10/2022 | Holm et al. |
| 11,533,272 | B1 | 12/2022 | Sastry |
| 11,583,774 | B2 | 2/2023 | Døssing et al. |
| 11,617,954 | B2 | 4/2023 | Pedersen et al. |
| 11,623,146 | B2 | 4/2023 | Rispoli et al. |
| 11,625,990 | B2 | 4/2023 | Nakamura |
| 11,712,620 | B2 | 8/2023 | Bakalash |
| 11,755,111 | B2 | 9/2023 | Nickerson |
| 11,756,255 | B2 | 9/2023 | Bakalash et al. |
| 12,137,289 | B1 | 11/2024 | Kim |
| 12,151,166 | B2 | 11/2024 | Bakalash |
| 12,167,034 | B2 | 12/2024 | Salmon-Legagneur et al. |
| 12,167,035 | B2 | 12/2024 | Xiu et al. |
| 12,220,643 | B2 | 2/2025 | Bakalash |
| 2005/0128212 | A1 | 6/2005 | Edecker et al. |
| 2006/0132495 | A1 | 6/2006 | Anderson |
| 2007/0063997 | A1 | 3/2007 | Scherer et al. |
| 2007/0257911 | A1 | 11/2007 | Bavoil et al. |
| 2008/0074416 | A1 | 3/2008 | Brown et al. |
| 2011/0298922 | A1 | 12/2011 | Horovitz et al. |
| 2014/0378022 | A1 | 12/2014 | Muthyala et al. |
| 2014/0378023 | A1 | 12/2014 | Muthyala et al. |
| 2015/0058229 | A1 | 2/2015 | Wiacek et al. |
| 2016/0253843 | A1 | 9/2016 | Lee |
| 2017/0094262 | A1 | 3/2017 | Peterson et al. |
| 2017/0189797 | A1 | 7/2017 | Muthyala et al. |
| 2017/0304732 | A1 | 10/2017 | Velic et al. |
| 2017/0372508 | A1 | 12/2017 | Schoeneman |
| 2018/0085682 | A1 | 3/2018 | Anderson |
| 2018/0264365 | A1 | 9/2018 | Soederberg et al. |
| 2019/0089760 | A1 | 3/2019 | Zhang et al. |
| 2019/0138785 | A1 | 5/2019 | Olsen et al. |
| 2019/0240581 | A1 | 8/2019 | Walker et al. |
| 2020/0327712 | A1* | 10/2020 | Yoon ........................ G06T 15/04 |
| 2020/0341538 | A1 | 10/2020 | Zhu et al. |
| 2021/0074052 | A1 | 3/2021 | Ha et al. |
| 2021/0121782 | A1 | 4/2021 | Døssing et al. |
| 2021/0187389 | A1 | 6/2021 | Hansen et al. |
| 2021/0375025 | A1 | 12/2021 | Yan |
| 2022/0004671 | A1 | 1/2022 | Zechlin |
| 2022/0096947 | A1 | 3/2022 | Schou et al. |
| 2022/0180602 | A1 | 6/2022 | Hao et al. |
| 2022/0246061 | A1 | 8/2022 | Vuong et al. |
| 2022/0277507 | A1 | 9/2022 | Park et al. |
| 2022/0323865 | A1 | 10/2022 | Holm et al. |
| 2022/0366813 | A1 | 11/2022 | Shaw |
| 2023/0056829 | A1 | 2/2023 | Holm et al. |
| 2023/0065252 | A1 | 3/2023 | Døssing et al. |
| 2023/0107385 | A1 | 4/2023 | Salk |
| 2023/0154115 | A1 | 5/2023 | Jung et al. |
| 2023/0158405 | A1 | 5/2023 | Holm et al. |
| 2023/0315929 | A1 | 10/2023 | Kim |
| 2024/0354889 | A1 | 10/2024 | Boyce et al. |
| 2025/0144531 | A1 | 5/2025 | Bakalash |

OTHER PUBLICATIONS

School Interior Design. https://envoplan.co.uk/school-interior-design-services/school-interior-design/.

Online Interior Design Classes for Kids & Teens. https://outschool.com/online-classes/interior-design.

Jon Peddie, Realtime ray tracing shown by Adshir at Siggraph , Graphic Speak, Aug. 9, 2019 (2 pages).

Kato, D.; Hattori, K.; Iwai, S.; Morita, M. "Effects of collaborative expression using Lego® blocks, on social skills and trust". Social Behavior and Personality. (2012).

Video Games, Digital Play, and the Future of the Lego Group. https://padandpixel.com/video-games-digital-play-and-the-future-of-the-lego-group/.

R. Katz, S. Ogilvie, J. Saw, L. Woodhead; Gen Z,, "For me, online and offline are one and the same, basically the same thing, integrated" (Explained. The Art of Living in a Digital Age. Chicago Univ. Press, 2021).

Zhou, B., et al., A 10 million Image Database for Scene Recognition, 2017 (14 pages).

Anton Gerdelan Cube Maps: Sky Boxes and Environment Mapping, Oct. 2, 2016 (15 pages).

Nealen, Andrew Shadow Mapping and Shadow Volumes: Recent Developments in Real-Time Shadow Rendering, University of British Columbia, 2002. (7 pages).

Celarek Adam, Merging Ray Tracing and Rasterization in Mixed Reality, Computer graphics, Projects 2013 (2 pages).

Legos with ARKit2 (with commentary). WWDC Keynote 2018. YouTube video. TWIT Tech Podcast Network. Jun. 4, 2018 <http://www.youtube.com/watch?v=JwSIKwuT8VI> (Year: 2018).

Ramel, David, Apple Boosts IOS Augmented Reality Development with ARKit2. ADTMAG. Jun. 5, 2018. < http://adtmag.com/articles/2018/06/05/arkit-2.aspx> Year: 2018).

"Photorealism", Merriam-Webster.com Dictionary, Accessed Aug. 16, 2024 (9 pages).

Jon Peddie, "Real-time ray tracing on any smartphone Available for years, it's finally available from Snap.", JPR, Feb. 17, 2023 (3 pages).

* cited by examiner

1

NON-PLANAR REAL-TIME MIRRORING BY RASTER GRAPHICS

CROSS-REFERENCE TO RELATED CASES

The present application is a continuation in part of the U.S. application Ser. No. 19/239,000 filed Jun. 16, 2025, entitled: "GAMING WITH REAL-TIME NON-PLANAR RASTER MIRRORING", which is incorporated in its entirety for all purposes as if fully set forth herein.

FIELD OF THE DISCLOSURE

The present invention discloses raster graphics method and system for generating real-time mirrored images in non-planar surfaces.

BACKGROUND

Reflections (mirroring). Reflections are one of the most important parts of a realistic scene. In computer graphics, reflections are a technique used to simulate how light bounces off surfaces, creating realistic images in reflective surfaces, like mirrors and shiny objects. Accurate reflections are commonly computed using ray tracing, but not raster graphics. E.g. Bakalash et. al., METHOD for NON-PLANAR SPECULAR REFLECTIONS in HYBRID RAY TRACING, U.S. Pat. No. 10,699,468 and Bakalash et. al., METHOD for PHOTOREALISTIC REFLECTIONS in NON-PLANAR REFLECTIVE SURFACES, U.S. Pat. No. 11,010,957. In raster graphics approximate reflections can be computed by using simpler methods such as environment mapping (cubemap). However, since the cubemap is rendered from a single point, not from a large surface, the reflections have increasingly incorrect perspective and occlusion the farther you get from that point, which are incorporated hereby by reference. In general, while mirroring technology on planar surfaces tends to be straightforward, non-planar surfaces introduce complexities that require more sophisticated approaches.

There are three game-changer aspects of real-time mirroring, especially to the field of video gaming. The first is the capability to deliver a maximal experience of bodily self-consciousness, which may give us feedback on who we are and what we are experiencing at the moment. A quick glance in the mirror reaffirms our sense of self. If our facial image replaces the face of a movie character, then on top of his visual reflection one can identify with the hero. The second aspect for games is an extended reach of gamer's view beyond camera angles. A story may be found inside a mirror or car reflection with off-screen objects or animations, while otherwise invisible. They may hint what is happening in hidden parts of the scene to catch danger before time, wherein the gamer needs to make a tactical and strategic decision in a blink of time. The third aspect is mirrored-spaces reflections handling both occluded objects, advanced real-time lighting techniques, and multiple reflective surfaces like mirror rooms or multiple non-planar reflective objects spread around, bouncing reflections with each other, revealing hidden objects or events. Such real-time mirroring effects in a game may allow new and exciting gaming genres. A story may be found inside a mirror or car reflection with off-screen objects or animations. They may hint what is happening in hidden parts of the scene (such as behind the gamer) to catch danger before time, wherein the gamer needs to make a tactical and strategic decision in a blink of time.

Bodily self-consciousness. The experience of bodily self-consciousness or embodiment comes from the coherent multisensory integration taking place in the brain and relates to the notion of egocentric perspective on the self. In real life, we typically use mirrors and reflective surfaces for the egocentric first-person perspective. They play an important role in our psychological and emotional functioning. Reflections help us develop our sense of self. Researchers infer that if subjects can tell that the image on the reflective surface is in fact them, then they have developed a cognitive sense of self.

In fact, we come to develop a sense of self through early interactions in which our caregivers mirror or imitate our movements and emotional expressions and respond to us in ways that give us feedback that we are separate from them, and that our behaviour creates a reaction in them. It seems that we need a context outside ourselves to self-recognize—other people reflect us as individuals, and mirrors do too. We use the mirror as we do face-to-face communication: to get feedback on who we are and what we are experiencing at the moment. A quick glance in the mirror reaffirms our sense of self. If our facial image replaces the face of a movie character, then on top of his visual reflection one can identify with the hero.

To achieve a maximal experience of embodiment, the brain must be fed by images that are faithful to reality. Cinematographic movies are an important source of photo-realistic images of self. However, to generate computer graphics images of self, such as in gaming applications, a new raster-graphics mirroring technology is imperative.

This might be a game-changer, taking the gamer's experience a quantum leap upward and upgrading the gaming rules. Certainly, a new level design and game strategy is required. The game designers need to raise the designing level according to the new and unique information provided to the gamer, wherein the gamer needs to make new tactical and strategic decision in a blink of time.

The applicational aspects of real time reflections are thoroughly described in US Publication 2025/0144531 of Bakalash entitled: Real-Time Ray Traced Virtual Reality Gaming, which is incorporated hereby by reference. US Publication 2025/0144531 integrates the physical reality and virtual reality worlds, termed Integrated Reality, in a single gamified application. Both worlds share the same gaming environment, objectives, and context. The invention matches key advantages of the real-time ray tracing technology, taking the user's experience a quantum leap upward by a high degree of visual realism, bodily self-consciousness of the gamer, and camera angles with off-screen objects.

As appropriate, providing real-time reflections in raster graphics technology.

As appropriate, providing real-time reflections in planar and non-planar surfaces in raster graphics technology.

As appropriate, providing real-time reflections in non-planar surfaces in raster graphics technology.

As appropriate, enabling real-time planar and non-planar reflections in gaming applications.

As appropriate, enabling real-time generation of planar and non-planar reflections on standard graphics pipelines.

As appropriate, utilizing the data of reflective surface and target data which is stored in a 3D model file.

As appropriate, speeding up the generation of planar and non-planar reflections by utilizing an early-Z GPU mechanism.

As appropriate, generation of animated planar and non-planar reflections by utilizing the GPU hardware of early-Z mechanism.

SUMMARY OF THE DISCLOSURE

The mirroring method of the present disclosure is based on a raster hardware of Graphics Processing Unit (GPU) and vertex, geometry, raster and compute shaders. Raster graphics hardware controls the visual appearance of 2D and 3D graphics, while defining how elements are rendered in terms of color, lighting, and texture.

The method exploits the GPU's massively parallel processing capabilities, allowing to perform the mirroring effect calculations in real-time. According to the current invention the 3D scene, defined in world coordinates, is divided between reflective surfaces and surrounding target objects. A non-planar reflective surface is rasterized into pixels (termed "receiving" pixels) each keeping its normal value and position. Then a surrounding visual data (such as pixel's depth, color, lighting, texture, material) of target triangles is collected to the receiving pixels utilizing a pixel-shot-triangle algorithm, which is a process of determining a triangle, out of mesh of triangles, shot from pixel having a position and normal direction.

A pixel-shot-triangle search extends in the normal direction of the receiving pixel, encountering a corresponding "emitting" pixel in the intersected target triangle. To optimize the pixel-shot-triangle intersections an acceleration structure (AS) is used, significantly improving rendering speed. The collected data of depth, color, lighting, texture and material from the emitting pixel is stored in reflection buffer representing the pixel's reflected data. The reflection buffer, comprising the aggregated data of all receiving pixels, is then transformed from world coordinates to the camera view, and stored in the frame buffer, for displaying a mirrored image on the screen. The currently disclosed mirroring method differs essentially from that of ray tracing. Ray tracing capability to generate reflections stems from the use of primary, secondary, ternary, etc. rays. The mirrored image in ray tracing is generated by hitting a reflecting surface, consisting of triangles, by primary rays, then generating secondary rays that bounce out of the surface toward surrounding objects, collecting information for the mirrored image, and handing this collected information over to primary rays. The primary ray's data is stored in an in-memory buffer.

The present raster method differs in that it does not use any rays. The reflecting surface of triangles is replaced by pixels which are generated by raster-shader, and the collected mirroring image is stored in a frame buffer.

The distinction between ray tracing and raster graphics is crucial, as in the present disclosure the rasterization, data collection and display of the mirrored data occur entirely within the raster graphics domain. The currently disclosed methodology avoids any reliance on ray tracing algorithms, ensuring that the rendering pipeline is fundamentally raster-based. The result is a direct progression from analytical calculations to rasterization, culminating in the assembly of the final image within the frame buffer.

Although acceleration structures are used in ray tracing, they are not exclusive to ray tracing and can also be used in other areas of computer graphics and beyond for optimizing spatial queries. The underlying principles of spatial organization acceleration structures employ are applicable to a broader range of geometric problems that benefit from hierarchical data structures, such as General-Purpose Collision Detection, Spatial Queries for points, objects, or regions within a 3D space, Physics Simulations, Scientific Data Visualization, and Computer-Aided Design (CAD).

The build and update of accelerating structures are time-consuming, challenging the real-time requirements. AS must be repeatedly reconstructed upon scene changes, which contradicts with mirroring of real time skinned animation.

In order to accommodate real-time skinned animation, the present invention employs a genuine multiplication of AS pipelines, enabling AS low-cost build, update and merge for real-time mirroring. Aside from static AS, additional dynamic AS pipelines (one or more) are utilized. The merge of the resulting reflection buffers utilizes an early-Z mechanism found in GPU.

The advantages of the disclosed raster-based mirroring method is a real time performance and a low price of a standard raster graphics.

BRIEF DESCRIPTION OF THE DRAWINGS

For a better understanding of the embodiments and to show how they may be carried into effect, reference will be made, purely by example, to the accompanying drawings.

With specific reference now to the drawings in detail, it is stressed that the particulars shown are by way of example and for purposes of illustrative discussion of selected embodiments only and are presented in the cause of providing what is believed to be the most useful and readily understood description of the principles and conceptual aspects. In this regard, no attempt is made to show structural details in more detail than is necessary for a fundamental understanding; the description taken with the drawings makes apparent to those skilled in the art how the several selected embodiments may be put into practice.

As used in this specification, the singular indefinite articles "a", "an", and the definite article "the" should be considered to include or otherwise cover both single and plural referents unless the content clearly dictates otherwise. In other words, these articles are applicable to one or more referents. As this specification uses, "or" is generally employed to include or otherwise cover "and/or" unless the content dictates otherwise.

As used in the specification, the term "pixel-shot-triangle", is an algorithm of determining a triangle, out of mesh of triangles, shot from pixel having a position and normal direction.

As used in this specification, the term "triangle" may include the term "polygon".

Figure 1:
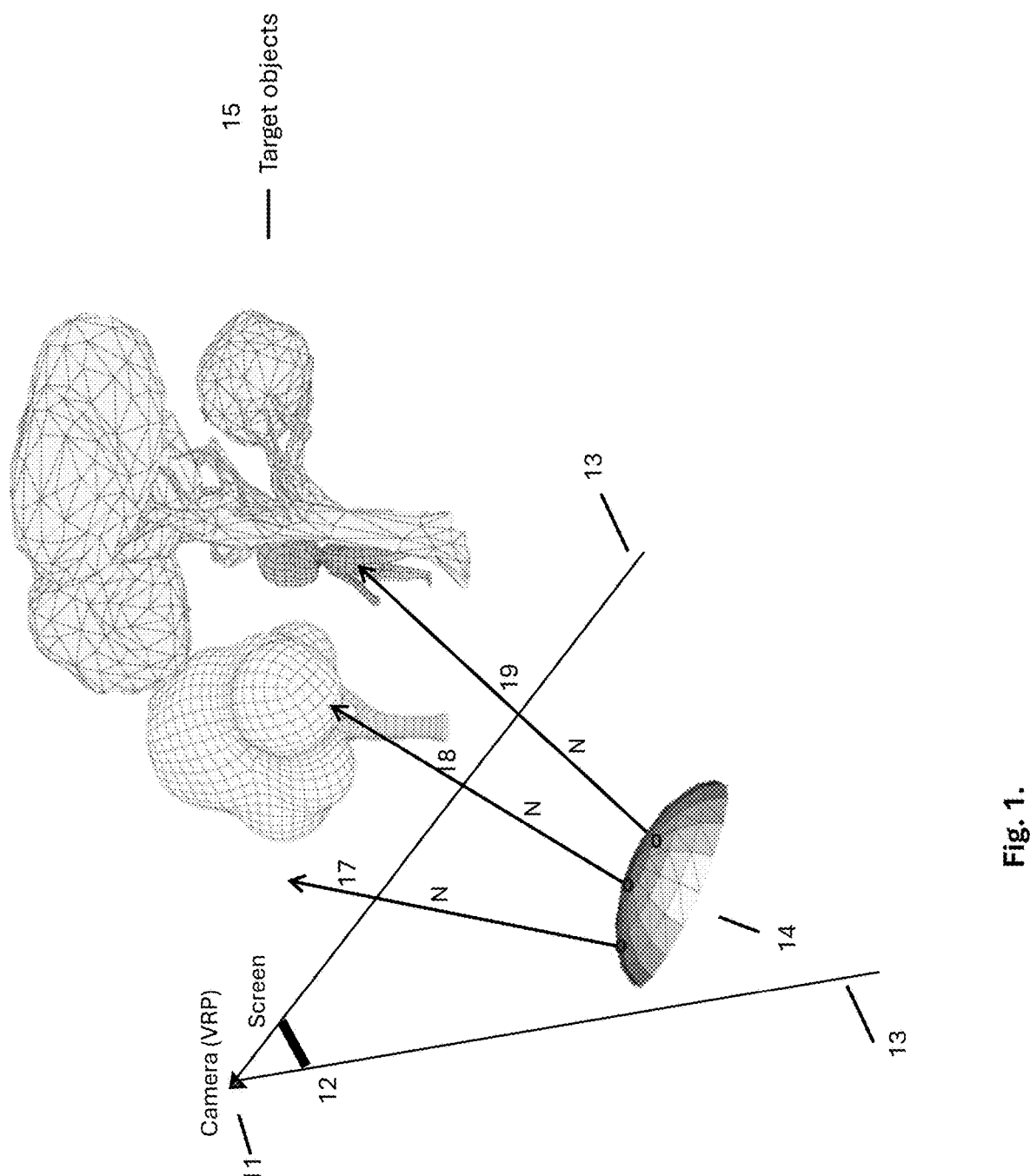
Figure 2:
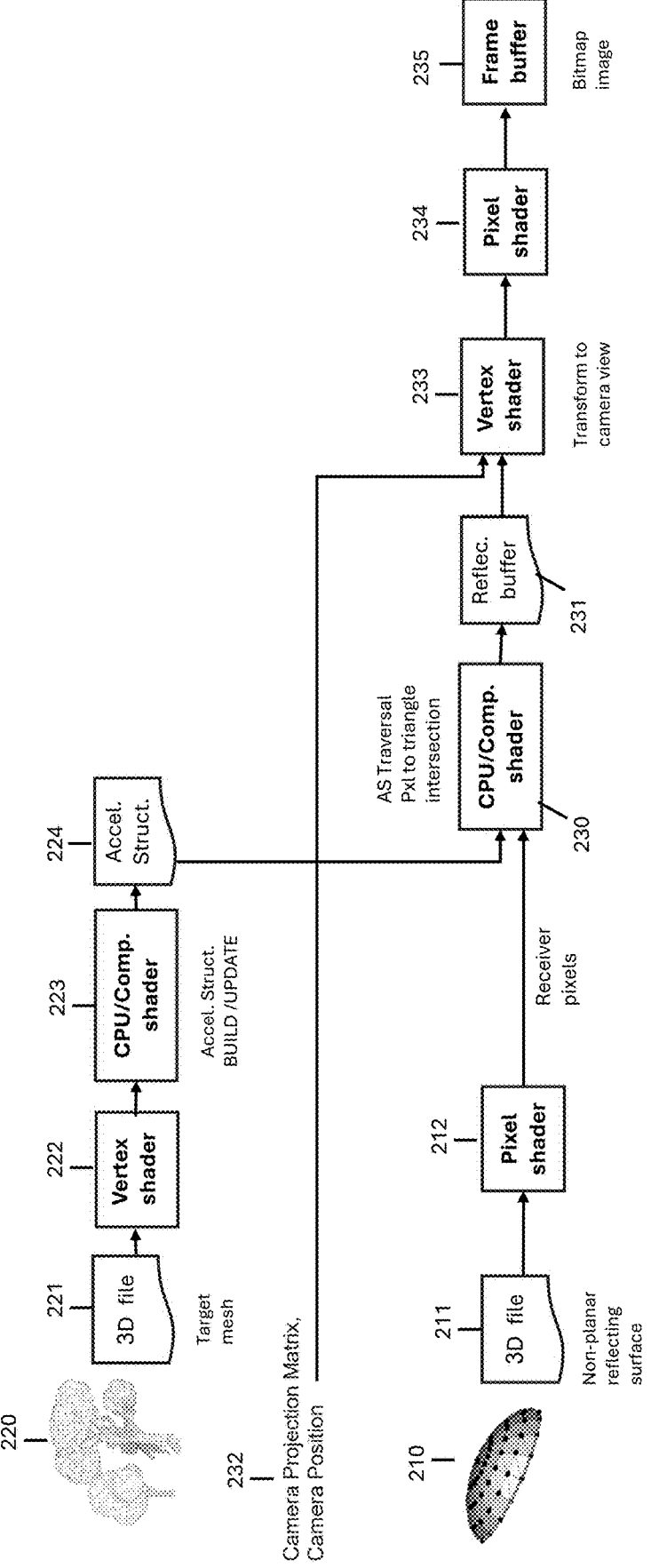
Figure 4:
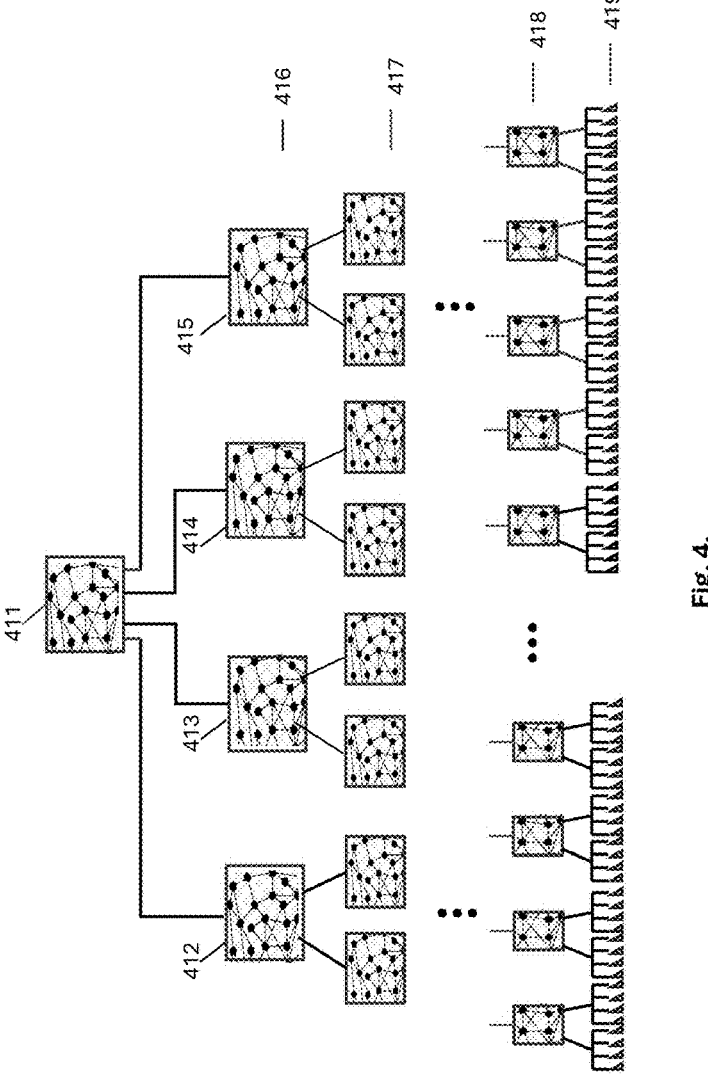
Figure 3:
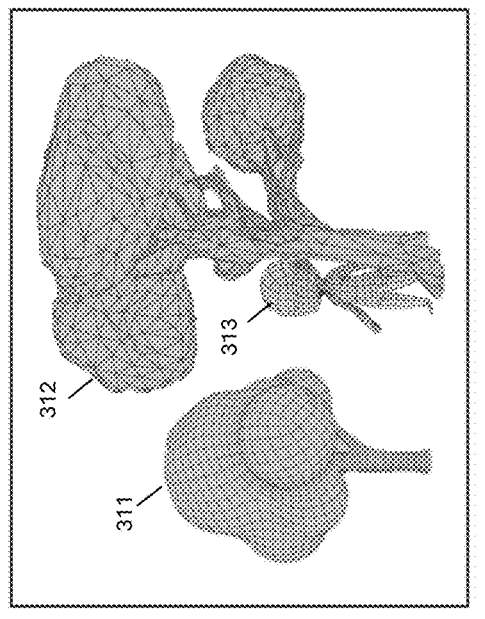
Figure 6:
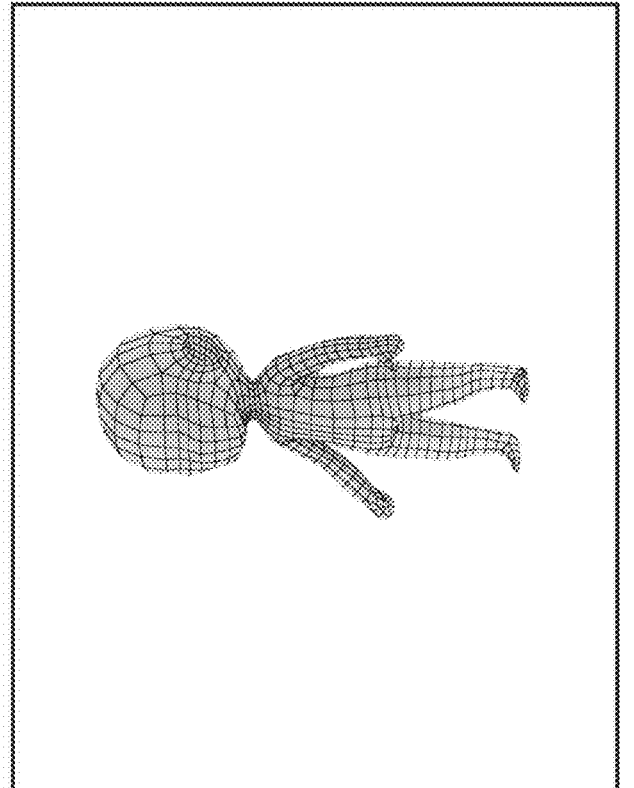
Figure 5:
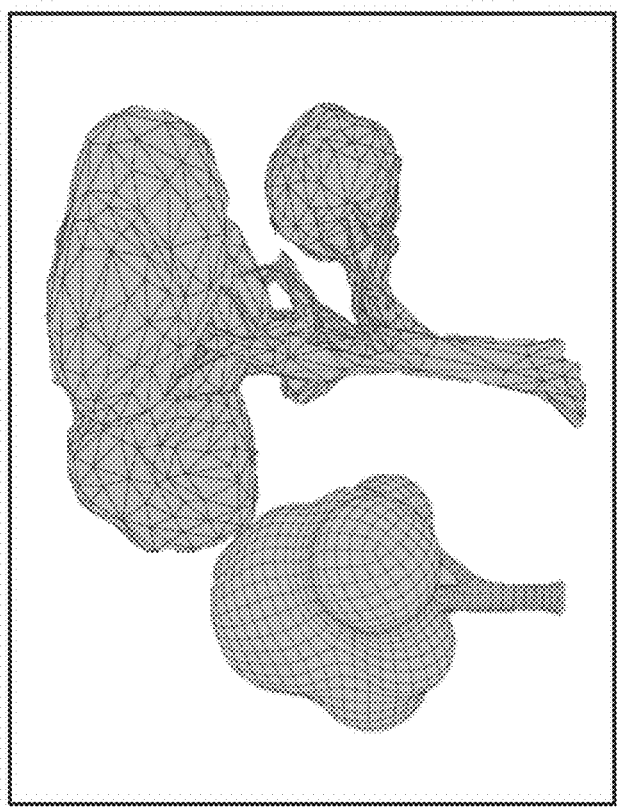
Figure 8:
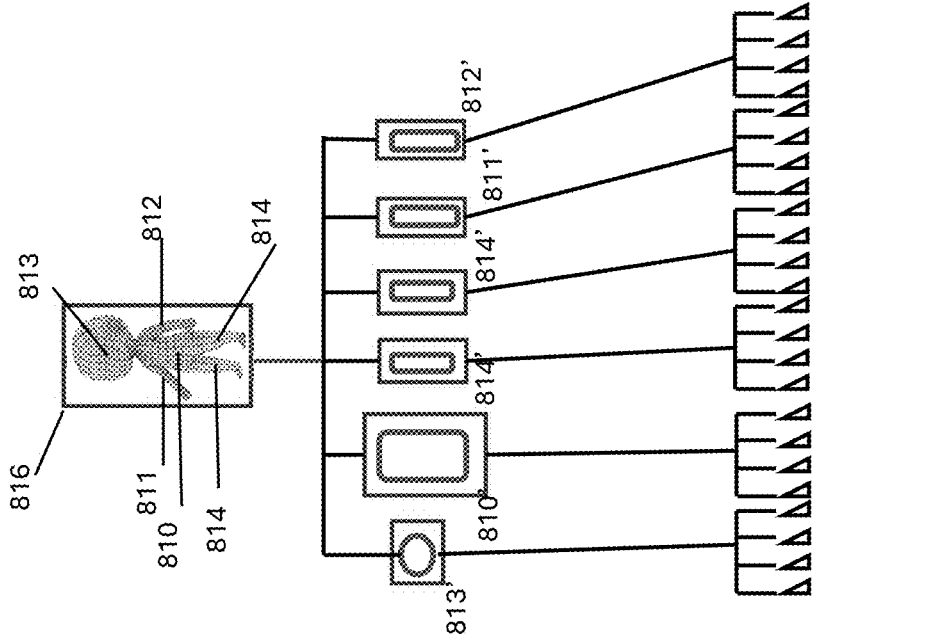
Figure 7:
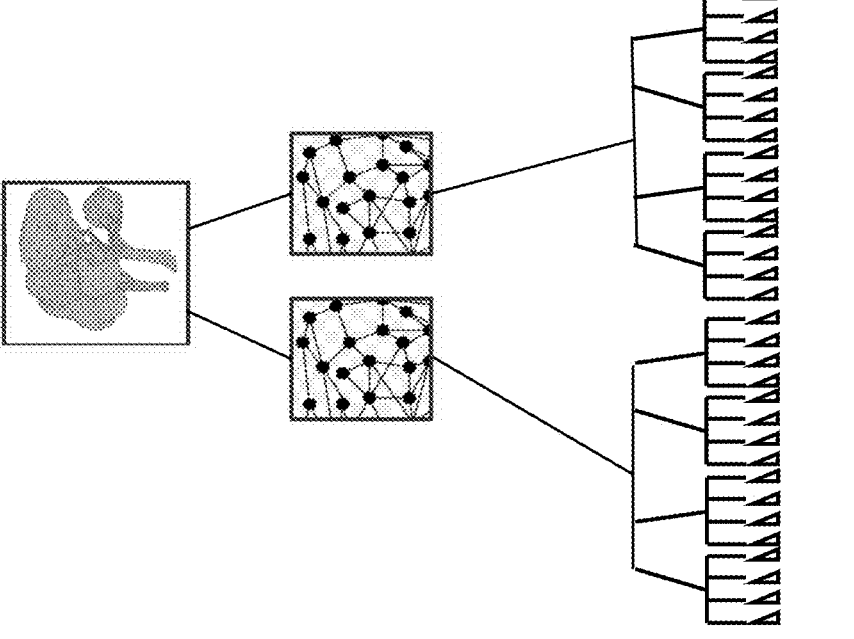
Figure 9:
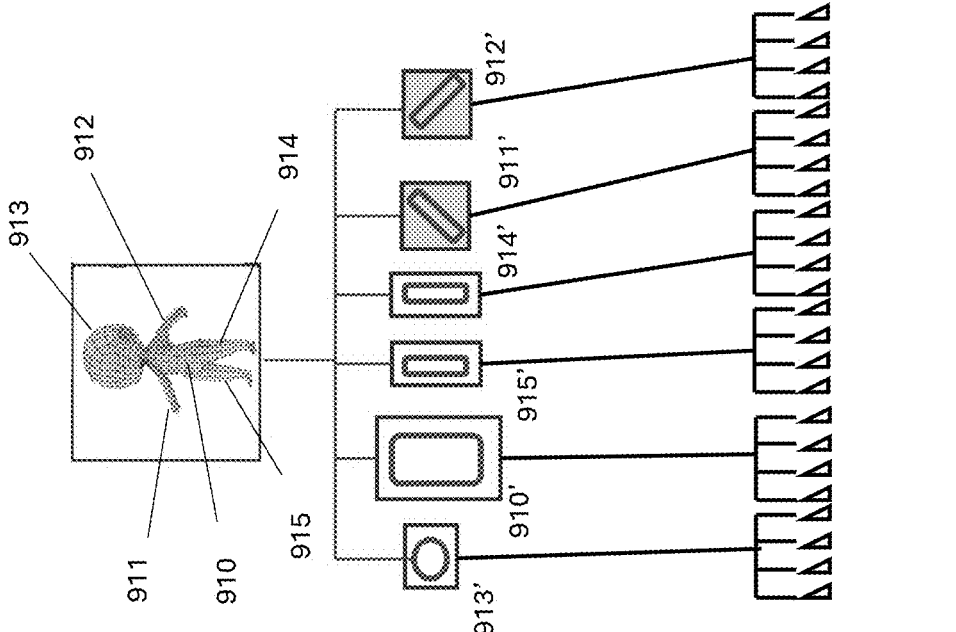
Figure 10:
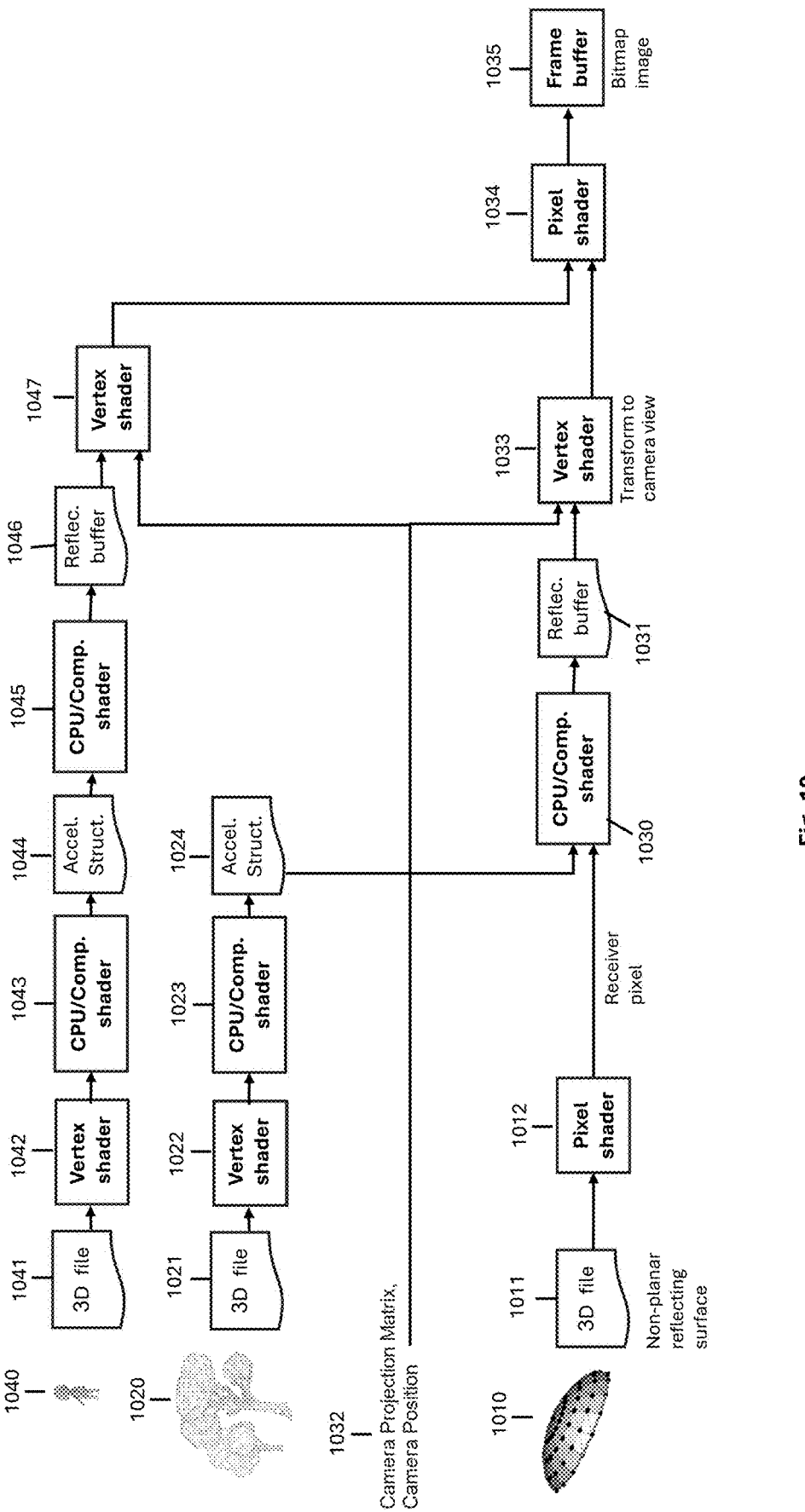
Figure 11:
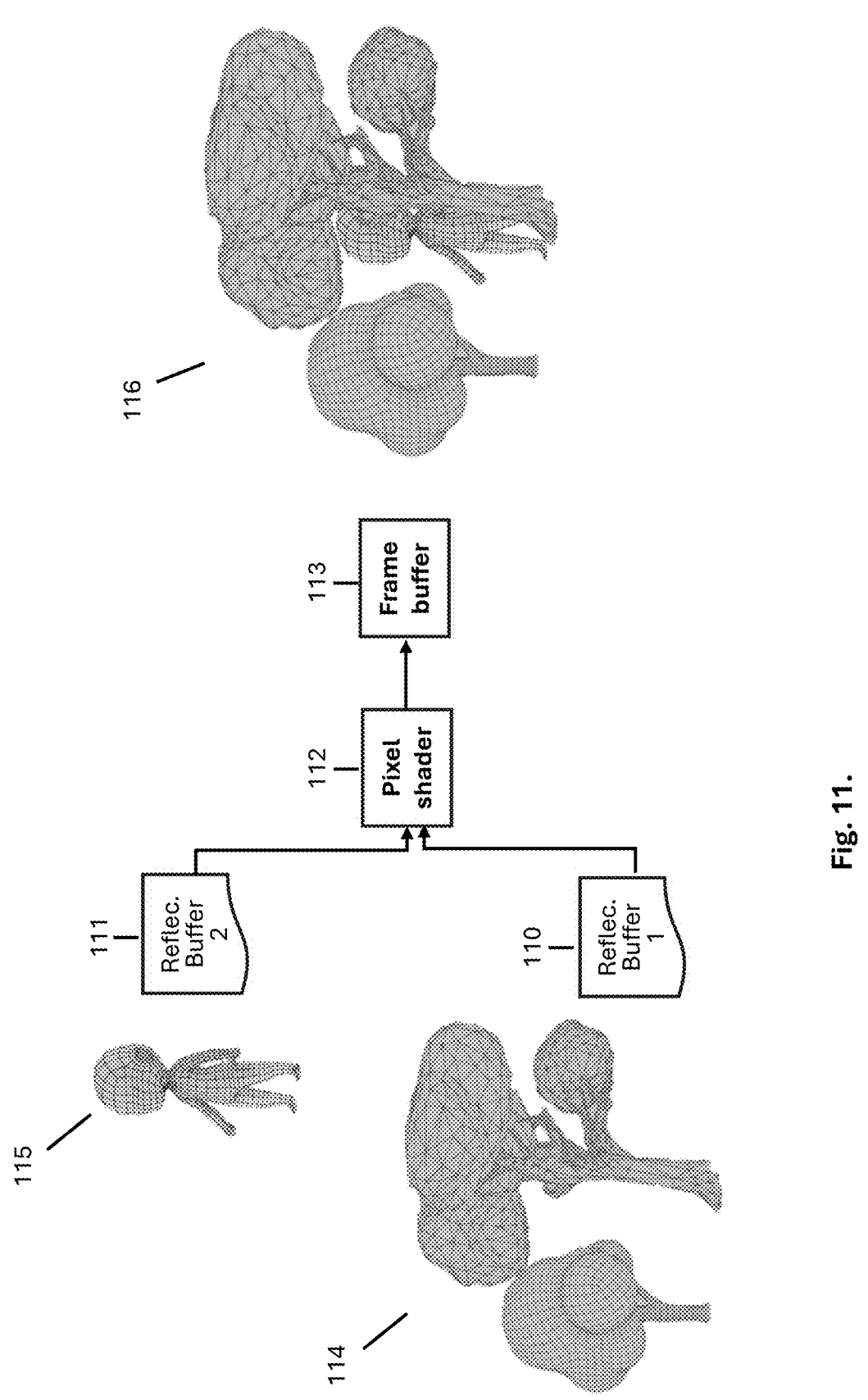
Figure 12:
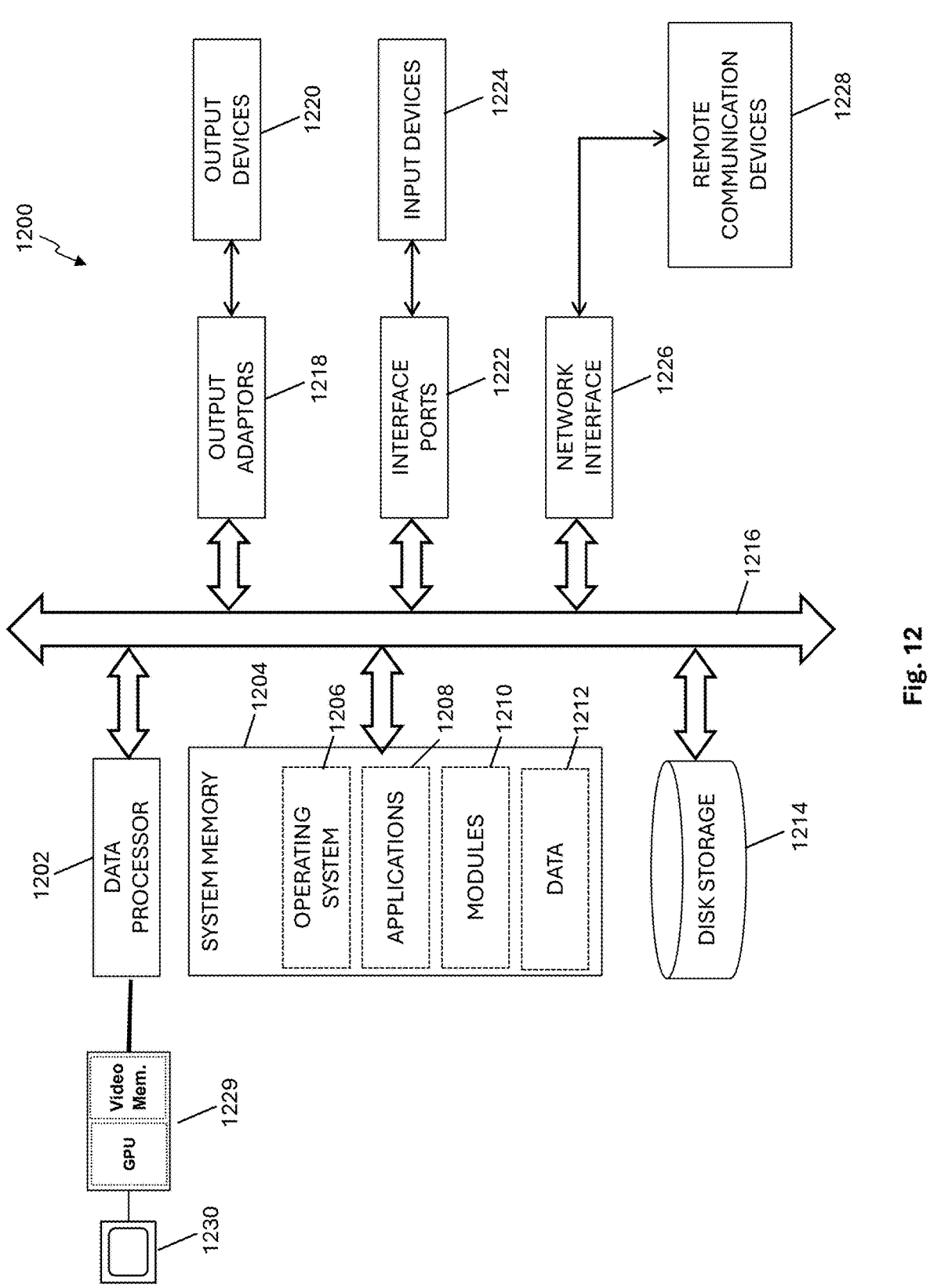

In the accompanying drawings:

FIG. 1. illustrates a schematic representation of a scene setup for a non-planar reflection, in accordance with an exemplary embodiment of a present invention;

FIG. 2. Illustrates a schematic representation of a non-planar reflection system based on raster graphics, in accordance with an exemplary embodiment of a present invention;

FIG. 3. illustrates a schematic representation of target objects, as viewed from the non-planar reflecting surface, in accordance with an exemplary embodiment of a present invention;

FIG. 4. illustrates a schematic representation of an acceleration structure of the target objects, in accordance with an exemplary embodiment of a present invention;

FIG. 5. illustrates a schematic representation of a static part of the split target objects, in accordance with an exemplary embodiment of a present invention;

FIG. 6. illustrates a schematic representation of the dynamic part of the divided target objects, in accordance with an exemplary embodiment of a present invention;

FIG. 7. illustrates a schematic representation of an acceleration structure of the static target objects, in accordance with an exemplary embodiment of a present invention;

FIG. 8. illustrates a schematic representation of an acceleration structure of the dynamic target object, in accordance with an exemplary embodiment of a present invention;

FIG. 9. illustrates a schematic representation of an acceleration structure of the dynamic target object following a skinned move of the object, in accordance with an exemplary embodiment of a present invention;

FIG. 10. Illustrates a schematic representation of raster-based mirroring system with two acceleration structure pipelines, in accordance with an exemplary embodiment of a present invention;

FIG. 11. Illustrates a schematic representation of merging mechanism utilizing early-Z depth testing to the frame buffer, in accordance with an exemplary embodiment of a present invention;

FIG. 12. Illustrates a block diagram of an exemplary system for implementing various aspects of the invention.

DETAILED DESCRIPTION OF THE DISCLOSURE

The mirroring stages of the present invention are performed by conventional raster hardware of a modern raster graphics processing units (GPU), and software components of vertex, compute and pixel shaders, and frame buffer.

The method of mirroring a scene in reflecting surface is based on collecting the target visual data (shape, depth, color, lighting, texture and material) as it is viewed from the reflecting surface and storing it in a reflection buffer as a raster bitmap aimed to the frame buffer for display on screen. Each pixel in the non-planar reflective surface has its own normal, defining its viewing direction toward the target and pointing on a corresponding pixel in the triangle mesh of target objects. The pinpointed emitting pixel carries unique data of depth, color, lighting, texture, material etc., determined by its parent triangle attributes.

The most compute demanding task is intersecting the emitting pixels by the receiving once. First, a triangle covering the emitting pixel must be found by "pixel-shot-triangle" algorithm, then the specific point of "emitting pixel" on the triangle. The "pixel-shot-triangle" is a process of determining a triangle, out of mesh of triangles, shot from pixel having a position and normal direction.

The pixel-shot-triangle task is accomplished by organizing the target objects in an acceleration structure (AS), which is a hierarchical data structure. AS are optimized to rapidly find pixel-shot-triangle intersections. In order to improve the efficiency of AS traversals, specifically for large, complex and animated models such as skinned human characters, according to one embodiment, the AS are split to separate static and dynamic structures.

FIG. 1, shows an exemplary setup of a scene: target objects 15, a reflecting non-planar surface 14, a camera 11, and a virtual screen 12. The camera serves as the origin of a frustum projection 13 in which a reflected image in a non-planar reflective surface 14 is seen. Although the scene is given and processed in world coordinates, however after generating the mirroring images, it is transformed, including the mirroring surface, to camera view. The reflective surface consists of multiple receiving pixels, each having a normal according to its position on the non-planar surface. A pixel's normal points on the viewing direction into the environment scene. Normal directions of three pixels are shown. The normal of pixel 18 is directed toward a static target object, a tree. The normal of pixel 19 is directed toward a dynamic target object of a human character, possible be an animated object. Pixel 17 misses target objects.

A schematic drawing of the raster-based system of the present invention is shown In FIG. 2. The objects of the scene are delivered as 3D graphics files of polygon mesh: the target objects 221, and the non-planar reflecting surfaces 211.

A 3D graphics file contains data about an object's geometry (shape), appearance (color, texture, materials), scene (lighting and camera positions), and animation (movement and transformation). These components are stored as binary data to define a three-dimensional model. Geometry defines the model's physical shape and structure using points, lines, and polygons to create its form. Texture adds detail and realism to a model's surface, including its color, pattern, and surface properties like glossiness or transparency. Materials describe the surface characteristics (e.g. reflectiveness) and properties that give the model its visual appearance. Scene includes information about the virtual environment where the 3D object exists, such as the position and intensity of light sources and the camera's view.

In an embodiment, world's coordinates of the incoming 3D files are assumed, while the final result, a reflection buffer, will be transformed to the camera's view. Animation brings the 3D model to life by detailing how it moves and transforms over time. Animation can be applied to part or all target objects and mirroring surfaces.

In an embodiment, a non-planar reflecting surface is delivered as a 3D file 211, along with parameters of vertex normals, depth, and position. Vertex normals are specified directly as vector data per vertex. Vertex depth is given through a set of (x, y, z) coordinates, where 'z' represents the depth in a 3D Cartesian coordinate system. This 3D coordinate, along with the 'x' (width) and 'y' (height) coordinates, defines a vertex as a point in 3D space. The depth is determined by the vertex's position along the Z-axis. A vertex position is provided by (x, y, z) coordinates within a Cartesian coordinate system. Each vertex, a single point, has these three values that define its location. The 3D data file 211 undergoes rasterization by a massively parallel pixel shader 212, replacing the triangles appearance by receiving pixels comprise the surface. The value of each pixel is determined by interpolating the closest vertex values for normal, depth and position, as well as its color by textures, lighting conditions and material properties. The output of the pixel shader is ready for pixel-shot-triangle intersection process 230 in an acceleration structure (AS).

The 3D data file of target objects 221 is uploaded to vertex processing engine, controlled by vertex shader program 222, where groups of three vertices are connected to form triangles. The coordinates are used to construct the shape of a 3D object by connecting vertices to form edges and faces, typically triangles. An acceleration structure is constructed out of these triangles 223. According to embodiment, AS is a spatial data structure optimizing the process of finding pixel-shot-triangle intersections between receiving pixels and target object triangles.

Firstly, the target geometry is pre-processed and organized into a hierarchical structure. Then, the hierarchical organization allows to quickly identify potential intersections, avoiding unnecessary tests and significantly improving rendering speed. Whenever a change occurs in the target geometry, the AS must be updated accordingly. The construction and update of an acceleration structure 224 can be done either by a compute shader or by a stronger CPU. However, modern GPUs include hardware accelerators that are designed to work with these acceleration structures, allowing for efficient build, update and execution of intersection queries. The pixel-shot-triangle traversal is executed on CPU/compute-shader 230. When a directed pixel is cast into the scene, the acceleration structure is traversed to quickly find regions containing geometry that might intersect the ray. Only the geometry within those identified regions is then subjected to pixel-shot-triangle intersection test. After the target triangle is identified, an accurate emitting pixel on the triangle, and its parameters, must be found. This is done by interpolating the triangle vertices according to the normal and position of the receiving pixel. The emitting pixel's data of position, depth, color, lighting, texture, and material is then copied to the reflection buffer 231.

After the aggregated result of all the surface's pixels is uploaded to the reflection buffer, its world's coordinates must be transformed according to the camera position 232. The transformation to camera view is done by vertex shader 233, which handles the receiving pixels and their associated data as point sprites (particles) which are defined by a single vertex. Finally, the transformed contents of reflection buffer are handled by pixel shader as a bitmap image, to be moved to frame buffer 235 for display.

An exemplary target scene is shown in FIG. 3a. The trees in the scene are static, whereas the human figure represent a dynamic object. All objects are considered equally for AS build and update. FIG. 3b shows an exemplary acceleration structure of the scene. It is built and updated as is, without distinguish between slow or fast changes in the scene. The major drawback associated with the use of a single acceleration structure is time-consuming build and update, challenging the real-time requirements. It must be repeatedly reconstructed upon scene changes, which contradicts with real time skinned animation.

In an embodiment, a genuine multiplication of AS pipelines accommodates real-time skinned animation. The multiplication of AS pipelines enable low-cost build and update of an AS for real-time mirroring. In the case of skinned animation, where some scene objects change more frequently than other scene objects, the AS updates will be done specifically for the animated objects, without effecting the static parts. As a result, two or more reflection buffers are generated and merged for final reflection by an early-Z mechanism of a GPU hardware.

The method is demonstrated in FIG. 5 and FIG. 6, where the same scene is split to two separate scenes, a static and dynamic, respectively. The acceleration structure of the static objects is shown in FIG. 7. It is built and updated by its own. The dynamic AS in FIG. 8 is especially adapted for animation, where each of its organs can be updated separately, e.g. the left hand 812 can be quickly raised by affecting the branch 812' only, and more importantly, without affecting the static structure of FIG. 7. E.g. in FIG. 9 the animated figure raises both hands affecting only the two highlighted branches, 911' and 912'.

A schematic drawing of the raster-based system of the present invention, with fast AS updates, is shown In FIG. 10. As shown, the animated part of target scene 1040 has an autonomous accelerating structure 1044 and build/update system 1043 and 1045. It is identical to the one described hereinabove in FIG. 2. Consequently, two separate reflection buffers 1031 and 1046 are created, typically at different frequencies. These buffers, after being transformed to camera view, are merged by pixel shader 1034, based on depth test (early-Z).

The hardware-based depth test (Early-Z) is a GPU hardware-level optimization that performs a depth test before the pixel shader runs. Early-Z testing is an optimization that compares a new fragment depth to the depth value already stored in the depth buffer (before shading), discarding fragments that are occluded by other objects, i.e. behind existing geometry. The performance is significantly improved by avoiding unnecessary pixel shading work.

FIG. 11 shows a merger of two reflection buffers into frame buffer, utilizing an early-Z depth testing. Reflection buffer-1 110 holds the reflection of the static object 114, while reflection buffer-2 111 holds the reflection of the dynamic object 115. The reflection buffer-1 is stored first in the frame buffer 113, then the depth values of the frame buffer-2 fragments are tested by early-Z in pixel shader 112. Only dynamic fragments that are not occluded by static objects are allowed to the frame buffer, as seen in 116. Only part of the human figure standing behind a tree is occluded.

Similarly, any two reflection buffers can be merged based on stand-alone early-Z hardware, even not associated with a graphics pipeline, when accompanied by an appropriate software.

FIG. 12 illustrates an exemplary system 1200 for implementing various aspects of the invention. System 1200 includes a data processor 1202, a graphics processing unit 1229, a system memory 1204, and a system bus 1216. The system bus 1216 couples the system components including, but not limited to, the system memory 1204 to the data processor 1202. The data processor 1202 can include one or more of any of the various available processors. The data processor 1202 refers to any integrated circuit or other electronic devices (or collection of devices) capable of operating on at least one instruction, including, without limitation, Reduced Instruction Set Core (RISC) processors, CISC microprocessors, Microcontroller Units (MCUs), CISC-based Central Processing Units (CPUs), Digital Signal Processors (DSPs), Graphics processing unit (GPU), and General-purpose graphics processing unit (GPGPU). Furthermore, various functional aspects of the data processor 1202 may be implemented solely as software or firmware associated with the processor. Dual microprocessors and other multiprocessor architectures also can be employed as the data processor 1202.

A GPU (Graphics Processing Unit) 1229 is a specialized electronic circuit that rapidly generates images for display and performs parallel processing, excelling at handling data-intensive, computationally demanding tasks. Originally designed for graphics and video, GPUs are now essential for AI, scientific computing, and other high-performance tasks due to their ability to perform the same operation on many data values simultaneously. GPUs can be found as discrete graphics cards or embedded directly into other devices like mobile phones and computers. The output of a GPU is typically displayed on a screen 1230.

The system bus 1216 can be any of several types of bus structure(s) including the memory bus or memory controller, a peripheral bus or external bus, and/or a local bus using any variety of available bus architectures known to those of ordinary skill in the art.

The system memory 1204 may include computer-readable storage media comprising volatile memory and non-volatile memory. The non-volatile memory stores the basic input/output system (BIOS), containing the basic routines to transfer information between elements within the system 1200. Non-volatile memory can include but is not limited to, read-only memory (ROM), programmable ROM (PROM), electrically programmable ROM (EPROM), electrically erasable programmable ROM (EEPROM), or flash memory. The volatile memory includes random access memory (RAM), which acts as external cache memory. RAM is available in many forms such as static RAM (SRAM), dynamic RAM (DRAM), synchronous DRAM (SDRAM), double data rate SDRAM (DDR SDRAM), enhanced SDRAM (SDRAM), SynchLink™ DRAM (SLDRAM), Rambus® direct RAM (RDRAM), direct Rambus® dynamic RAM (DRDRAM), and Rambus® dynamic RAM (RDRAM).

The system memory 1204 includes an operating system 1206 which performs the functionality of managing the system 1200 resources, establishing user interfaces, and executing and providing services for applications software. System applications 1208, modules 1210, and data 1212 provide various functionalities to system 1200.

System 1200 also includes disk storage 1214. Disk storage 1214 includes, but is not limited to, devices like a magnetic disk drive, floppy disk drive, tape drive, Jaz drive, Zip drive, LS-100 drive, flash memory card, or memory stick. In addition, disk storage 1214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM).

A user enters commands or information into system 1200 through input device(s) 1224. Input devices 1224 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input device 1224 connects to the data processor 1202 through the system bus 1216 via interface port(s) 1222. Interface port(s) 1222 include, for example, a serial port, a parallel port, a game port, and a universal serial bus (USB).

The output devices 1220 like monitors, speakers, and printers are used to provide the output of the data processor 1202 to the user. Another example is a USB port that may be used as an input device 1224 to provide input to system 1200 and output information from system 1200 to output device 1220. The output device 1220 connects to the data processor 1202 through the system bus 1216 via output adaptor 1218. The output adapters 1232 may include, for example, video and sound cards that provide a means of connection between the output device 1220 and the system bus 1216.

System 1200 can communicate with remote communication devices 1228 for exchanging information. The remote communication device 1228 can be a personal computer, a server, a router, a network PC, a workstation, a microprocessor-based appliance, a mobile phone, a peer device, or another common network node and the like.

Network interface 1226 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The invention claimed is:

1. A raster-based method for generating a mirrored image of target objects, in a non-planar reflective surface, the method comprising the steps of:

rasterizing the non-planar reflective surface into receiving-pixels;

constructing the target objects into an acceleration structure;

handling the receiving-pixels for an acceleration structure search according to their normal direction, for seeking corresponding emitting-pixels, wherein data of the emitting pixels is stored in a reflection buffer;

transforming the reflection buffer to a camera view; and storing the transformed reflection buffer in a frame buffer as an image bitmap for a display;

wherein all steps are implemented by a vertex, computing or pixel shaders of a raster-based graphics processing unit.

2. The method of claim 1, wherein the reflective surface is rasterized by a pixel shader into multiple receiving-pixels, each having a normal value and position.

3. The method of claim 1, wherein the construction and update of the acceleration structure is done by a compute shader.

4. The method of claim 1, wherein the data of emitting-pixels consists of a depth, color, lighting, texture and material.

5. The method of claim 1, wherein after the data of emitting-pixels is stored in the reflection buffer, its coordinates are transformed to a-camera coordinates by a vertex shader.

6. The method of claim 1, wherein upon a target triangle is identified, an exact emitting-pixel and its data are found by interpolating the triangle vertices according to the position and normal value of the matching receiving-pixel, out of the receiving-pixels.

7. A raster-based system for generating a mirrored image of target objects in a non-planar reflective surface, the raster graphics system comprises:

a conventional raster graphics rendering pipeline;

a frame buffer;

at least one screen;

at least one general purpose processor;

at least one model of a non-planar reflective surface; and at least one model of target object;

wherein in runtime:

the non-planar reflective surface model is rasterized into receiving-pixels;

the target object model is constructed into an acceleration structure;

the receiving-pixels are handled for an acceleration structure search according to their normal direction, for seeking corresponding emitting-pixels, wherein data of the emitting-pixels is stored in a reflection buffer;

the reflection buffer is transformed to a camera view; and the transformed reflection buffer is stored in the frame buffer as an image bitmap for display.

8. The system of claim 7, wherein the reflective surface is rasterized by pixel shader into multiple receiving-pixels, each having a normal value and position.

9. The system of claim 7, wherein the construction and update of the acceleration structure is done by a compute shader.

10. The system of claim 7, wherein the data of emitting-pixels consists of a depth, color, lighting, texture and material.

11. The system of claim 7, wherein after the data of emitting-pixels is stored in the reflection buffer, its coordinates are transformed into camera coordinates by a vertex shader.

12. The system of claim 7, wherein after a target triangle is identified, an exact emitting-pixel and its data are found by interpolating the triangle vertices according to the position and normal value of the matching receiving-pixel, out of the receiving pixels.

* * * * *